United States Patent [19]

Gruber

[11] Patent Number: 5,438,452
[45] Date of Patent: Aug. 1, 1995

[54] BLOOMING PROTECTION FOR A NIGHTSIGHT

[75] Inventor: René Gruber, Widnau, Switzerland

[73] Assignee: Leica Heerbrugg AG, Heerbrugg, Switzerland

[21] Appl. No.: 948,352

[22] Filed: Sep. 23, 1992

[30] Foreign Application Priority Data

Sep. 27, 1991 [DE] Germany .................. 41 32 259.2

[51] Int. Cl.$^6$ .................. G03B 11/04; G02B 26/02
[52] U.S. Cl. .................. 359/511; 359/227; 359/234; 359/507
[58] Field of Search .................. 359/227, 232–236, 359/507, 511, 611–612, 894, 426–428, 350, 353, 355, 399; 354/287; 250/214 VT

[56] References Cited

U.S. PATENT DOCUMENTS

| | | | |
|---|---|---|---|
| 1,301,264 | 4/1919 | Hochstetter | 359/611 |
| 1,353,151 | 9/1920 | Deming | 359/428 |
| 1,755,036 | 4/1930 | Sussman | 359/611 |
| 2,374,991 | 5/1945 | Gordon | 359/227 |
| 3,133,140 | 5/1964 | Winchell | 359/511 |
| 4,393,403 | 7/1983 | Geis et al. | 358/113 |
| 4,415,242 | 11/1983 | Major | 359/511 |
| 4,582,400 | 4/1986 | Lough | 359/353 |
| 4,583,814 | 4/1986 | Koetser | 359/355 |

FOREIGN PATENT DOCUMENTS

| | | |
|---|---|---|
| 1037779 | 9/1953 | France . |
| 3313899A1 | 10/1984 | Germany . |
| 2166259 | 4/1986 | United Kingdom . |
| 228101 | 8/1990 | United Kingdom . |

OTHER PUBLICATIONS

Abstract of JP 57–095767, published Jun. 14, 1982.

*Primary Examiner*—Loha Ben
*Assistant Examiner*—Thong Nguyen
*Attorney, Agent, or Firm*—Foley & Lardner

[57] ABSTRACT

A blooming protection for a nightsight comprises a cylindrical cover of opaque material, which cover has an opening through which light can pass. The cover is plugged onto the tube on the objective side, like a protective cover. If the opaque section is aligned with a light source in the field of view, by rotating the cover, when observing a scene at night, not only is the blooming caused by said light source suppressed, but the overall contrast in the field of view is also increased. Furthermore, the life of the image-intensifier tube is extended, because of the reduced input radiation. Depending on the objective used, the shape and size of the opening in the cover through which light can pass can be constructed differently, and even variably.

4 Claims, 1 Drawing Sheet

BLOOMING PROTECTION FOR A NIGHTSIGHT

BACKGROUND OF THE INVENTION

The invention relates to a blooming protection for a night vision device or nightsight having an objective mounted in a tube.

When using a nightsight having high residual light gain to observe a scene at night, blooming and screening effects occur when there are light sources within the field of view. Associated therewith is a reduction in the contrast of the overall field of observation and increased difficulty in reading information displayed in the field of view of the nightsight.

A nightsight having an image intensifier tube is disclosed in U.S. Pat. No. 4,582,400 which is incorporated by reference.

DE-33 13 899 A1 discloses a device for viewing a luminous indicating instrument, which can also be viewed in darkness using a nightsight having high residual-light gain. In order to prevent blooming in this case, a first optical filter is arranged on the viewing side in front of the indicating instrument and a second optical filter is arranged in front of the photocathode of the nightsight, these filters having specific transmission properties as a function of the wavelength, which properties are matched to one another. The second filter which prevents the blooming comprises an Al-Sb layer which is vapor deposited onto the photocathode carrier of the image-intensifier tube.

SUMMARY OF THE INVENTION

The present invention is based on the object of specifying blooming protection for night vision devices, which protection can be produced easily and is available whenever required, as an accessory which can easily be handled and which has virtually no disadvantageous effect on the brightness of the field of view when it is used.

This and other objects and advantages of the invention may be realized and obtained by means of the instrumentalities and combinations particularly pointed out in the appended claims.

In accordance with the invention, blooming protection for a night vision device comprises an objective mounted in a tube, and a cylindrical cover is arranged in front of the objective, on the objective side, which cylindrical cover is supported such that it can rotate about the axis of said objective, wherein the cylindrical cover is made of an opaque material and has an opening through which light can pass.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
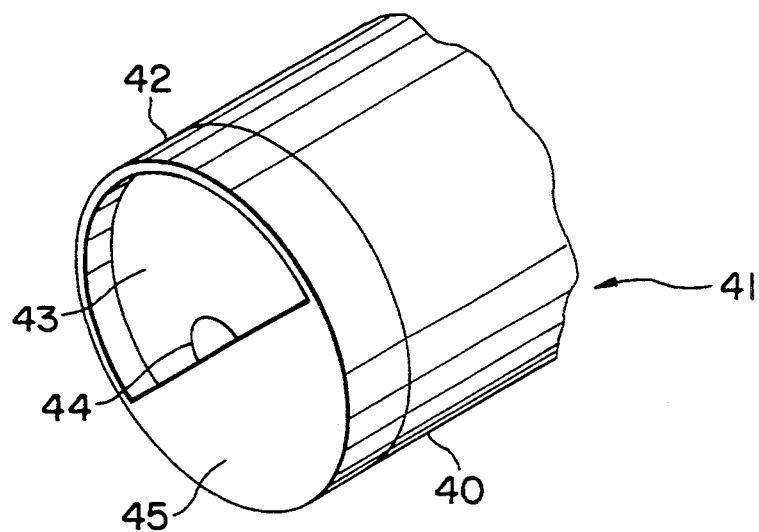
FIG. 1 shows a perspective view of an objective having a cover according to the invention in a first embodiment.

The invention is explained in the following text using two exemplary embodiments which are shown schematically in the drawings.

FIG. 1 shows the front part of a tube 10 of a mirror objective 11. On the objective side, a cylindrical cover 12 is plugged onto the tube 10, which cover 12 consists of an opaque material and can rotate about the axis of the objective 11. The cover 12 has an opening 13 through which light can pass and which has the shape of a circular section, and is arranged eccentrically with respect to the objective axis. The auxiliary mirror of the mirror objective is designated by 14. When viewing a scene at night which has light sources that cause blooming, it is merely necessary to plug the cover 12 onto the tube 10 and to rotate it in such a manner that the opaque section 15 is aligned with the light source.

Figure 2:
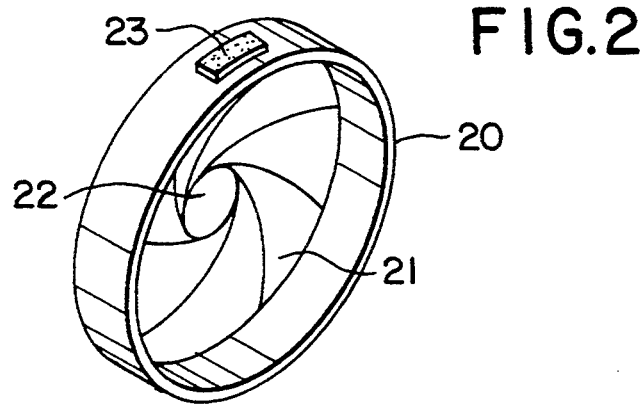
FIG. 2 shows a cover of a second embodiment in a perspective view.

The further embodiment of a cover 20, shown in FIG. 2, is constructed like an iris diaphragm having individual plates 21, and is suitable for refractive objectives. The size of the opening 22 through which light can pass can be adjusted by means of a handle 23. In this embodiment, there is no need for the cover 20 to be capable of rotation.

Surprisingly, it has been found that once this cover 12, 20, which is like a protective cover, has been placed onto the part of the objective socket on the objective side, no darkening of the field of view occurs if the opaque part of the cover is rotated in front of the interfering light source. All that occurs is extensive compensation for the blooming and screening effects, and an increase in the contrast in the field of view.

Since blooming also reduces the service life of the picture, or image-intensifier, tubes of night vision devices an increase in the life of the tubes is simultaneously achieved using the cover according to the invention because of the reduced input radiation.

Depending on the type of objective present, and the formation of the interfering light source, the opaque part and the opening in the cover through which light can pass may be of different shapes. In the case of a mirror objective, the opening 13 through which light can pass is preferably constructed in the form of a circular section and is arranged eccentrically with respect to the axis of the objective. In the case of normal, that is to say refractive objectives, a variable opening 22 through which light can pass, in the manner of an iris diaphragm or even a revolver diaphragm, can advantageously be provided.

The cover 12 is mounted directly in front of the front lens of the objective, by being plugged onto the tube of the same such that it can rotate, and in this way can easily be removed or replaced. It is self-evident that other fitment possibilities can also be provided, for example by means of latching springs in the cover and a groove in the tube, as are used for mounting objective protection covers or lens hoods on cameras.

It will be apparent to those skilled in the art that various modifications and variations could be made without departing from the scope or spirit of the invention and it is intended that the present invention cover the modifications and variations provided that they come within the scope of the appended claims and their equivalents.

What is claimed is:

1. Blooming protection for a night vision device comprising:
   an objective mounted in a tube; and
   a cylindrical cover arranged in front of the objective, on the objective side, which cylindrical cover is rotatably supported on said tube such that it can be rotated about an axis of said objective;
   wherein said cylindrical cover is made of an opaque material and has an opening through which light can pass, and
   wherein the opening through which light can pass is constructed in the form of a circular section and is arranged eccentrically with respect to the axis of the objective.

2. Blooming protection according to claim 1, wherein the tube is an image-intensifier tube, and wherein the cover provides blooming protection for the night vision device.

3. A combination comprising:
   a night vision device including a tube and an objective mounted in the tube; and
   a cylindrical cover arranged in front of the objective, on the objective side, which cylindrical cover is rotatably supported on said tube such that it can be rotated about an axis of said objective;
   wherein said cylindrical cover is made of an opaque material and has an opening through which light can pass, and
   wherein the opening through which light can pass is constructed in the form of a circular section and is arranged eccentrically with respect to the axis of the objective.

4. The combination according to claim 3, wherein the tube is an image-intensifier tube, and wherein the cover provides blooming protection for the night vision device.

* * * * *